United States Patent Office 3,079,406
Patented Feb. 26, 1963

3,079,406
1',1'-DIHALO AND 1'-CARBOXY-CYCLOPROPANO ANDROSTANE DERIVATIVES
Lawrence H. Knox, Mexico City, Mexico, assignor to Syntex S.A., Mexico City, Mexico, a corporation of Mexico
No Drawing. Filed Apr. 13, 1962, Ser. No. 187,227
Claims priority, application Mexico Jan. 3, 1962
18 Claims. (Cl. 260—397.1)

The present invention relates to certain new cyclopentanophenanthrene derivatives and to a process for the preparation thereof.

More particularly, the present invention relates to cyclopropane-(2',3',2,3)-androstane derivatives.

The new compounds object of the present invention, which are anabolic agents of reduced androgenic activity and which show antiestrogenic properties and inhibit the activity of the pituitary gland, are represented by the following formulas:

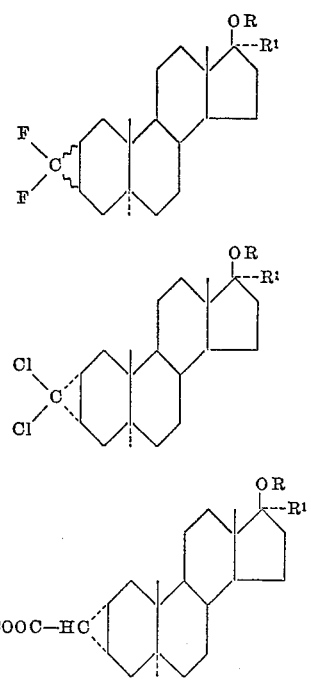

In the above formulas R represents hydrogen or a hydrocarbon carboxylic acyl group of less than 12 carbon atoms; $R^1$ and $R^2$ represent hydrogen or a lower alkyl group; the wavy lines indicate that the cyclopropane moiety may be in the 2α, 3α and 2β, 3β positions.

The acyl group derives from hydrocarbon carboxylic acids having less than 12 carbon atoms, which may be saturated or unsaturated, of straight, branched, cyclic or mixed aliphatic-cyclic chain, or aromatic, which may be further substituted with functional groups such as hydroxyl, alkoxy of up to 5 carbon atoms, acyloxy of up to 12 carbon atoms, nitro, amino or halogen. Typical such esters are the acetate, propionate, enanthate, benzoate, trimethylacetate, t-butylacetate, phenoxyacetate, cyclopentylpropionate, aminoacetate and β-chloropropionate.

The novel compounds of the present invention may be prepared by the process illustrated by the following equation:

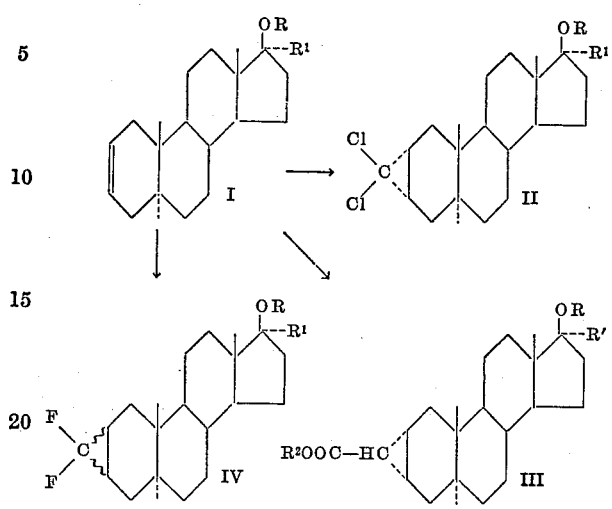

In the above fromulas R, $R^1$ and $R^2$ have the same meaning set forth previously.

In carrying out the process outlined above, the starting compound (I), which is an acylate, preferably the acetate of $\Delta^2$-androsten-17β-ol, or a 17α lower alkyl derivative, is treated with an alkali salt of trichloroacetic acid, preferably with sodium trichloroacetate, in an inert solvent having a boiling point between 125° and 160° C., such as for example bis-(2-methoxyethyl)-ether, at a temperature of approximately 125° C., for a period of about 2 hours, thus producing the acetate of 1',1'-dichlorocyclopropane - (2',3';2α,3α) - androstan - 17β - ol or its 17α-lower alkyl derivative (II).

By treating the starting compound (I) with an alkali salt of monochloro-difluoro acetic acid, preferably with sodium monochlorodifluoro-acetate, under the conditions described above for the reaction with sodium trichloroacetate, followed by chromatographic separation, there are obtained the acetate of 1',1'-difluorocyclopropane-(2',3';2α,3α)-androstan-17β-ol and its 2β, 3β-isomer, or their 17α-lower alkyl derivatives (IV).

By reacting the starting compound (I) with the diazoacetate of a lower alkyl, ethyl for example, in the presence of copper, in a solvent inert to the reagent such as 1,2-dimethoxy-ethane, there is obtained the acetate of 1' - carbethoxycyclopropane - (2',3';2α,3α) - androstan-17β-ol or its 17α-lower alkyl derivative (III: $R^2$=ethyl).

The 17β-acylates mentioned above, on saponification by conventional treatment in basic medium, afford the 17β-alcohols in the free form (II, III, IV: R=H). By the same reaction there are also hydrolyzed the 1'-carbethoxy groups (III: $R^2$=ethyl), to furnish the 1'-carboxy compounds (III: $R^2$=H).

The compounds having a secondary hydroxyl group (II, III, IV: R=$R^1$=H) are conventionally acylated in pyridine with an acylating agent, for example with an anhydride derived from a hydrocarbon carboxylic acid of the type set forth previously, thus giving the 17β-acylates.

The compounds having a tertiary hydroxyl group (II, III, IV: R=H; $R^1$=lower alkyl) are conventionally acylated in the presence of p-toluenesulfonic acid, with an acylating agent such as for example propionic anhydride, thus giving the corresponding acylates.

The following examples serve to illustrate but are not intended to limit the scope of the invention:

Example I

To a mixture of 1.9 g. of the acetate of $\Delta^2$-androsten-17β-ol (produced from dihydrotestosterone by bromination with 1 molar equivalent of bromine, reduction of the 2α-bromoketone thus obtained, and treatment of the resulting bromohydrin with zinc in acetic acid, to produce $\Delta^2$-androsten-17β-ol, which on conventional acetylation affords the desired acetate, as has been described in copending application Serial No. 128,361 filed August 1, 1961), 20 cc. of 1,2-dimethoxyethane and 300 mg. of recently prepared copper powder, at the reflux temperature, there was added dropwise and under stirring a solution of 3.4 g. of ethyl diazoacetate in 5 cc. of 1,2-dimethoxyethane, over a period of 2 hours, and the refluxing was continued for 2.5 hours further. Removal of the catalyst by filtration, followed by evaporation of the solvent, afforded a residue which after chromatography on Florisil yielded 1'-carbethoxycyclopropane-(2',3';2α,3α)-androstan-17β-ol acetate, which exhibited a melting point of 148–149° C., $[\alpha]_D$ +24.9° (CHCl$_3$).

Example II

To a solution of 1.9 g. of the acetate of $\Delta^2$-androsten-17β-ol in 50 cc. of bis-(2-methoxyethyl)-ether heated to 125–130° C. was added 4.4 g. of sodium trichloroacetate in 10 equal portions at 10 minute intervals. The reaction mixture was cooled, the sodium chloride formed was removed by filtration and the filtrate was evaporated to dryness under vacuum. The product was adsorbed on Florisil, and upon elution with hexane-ether there was obtained a residue which was recrystallized from methanol, thus giving 1',1'-dichlorocyclopropane-(2',3';2α,3α)-androstan-17β-ol acetate, which showed a melting point of 163–165° C., $\alpha_D$+37.2° (CHCl$_3$).

Example III

A mixture of 9.5 g. of the acetate of $\Delta^2$-androsten-17β-ol, 500 cc. of bis-(2-methoxyethyl)-ether and 18.3 g. of sodium monochlorodifluoroacetate was refluxed for 10 minutes, cooled to 50° C., treated with 18.3 g. more of the sodium salt and the mixture was refluxed again for 10 minutes. The solution was then filtered and the filtrate was evaporated to dryness. The residue was chromatographed on Florisil, thus furnishing two solid compounds which after crystallization produced 1',1'-difluorocyclopropane - (2',3';2α,3α) - androstan - 17β - ol acetate and 1',1' - difluorocyclopropane - (2',3';2β,3β) - androstan-17β-ol acetate.

Example IV

The starting compound in this example, namely 17α-methyl-$\Delta^2$-androsten-17β-ol, was obtained by oxidizing $\Delta^2$-androsten-17β-ol to form $\Delta^2$-androsten-17-one, which upon treatment with methyl magnesium bromide produced 17α-methyl-$\Delta^2$-androsten-17β-ol, which on conventional acetylation with acetic anhydride in the presence of p-toluenesulfonic acid yielded the desired 17-acetate.

This acetate was treated by the method described in Example I, thus giving 17α-methyl-1'-carbethoxycyclopropane-(2',3';2α,3α)-androstan-17β-ol acetate.

Example V

The acetate of 17α-methyl-$\Delta^2$-androsten-17β-ol was treated in accordance with Example II, thus producing 17α - methyl - 1',1' - dichlorocyclopropane - (2',3';2α, 3α)-androstan-17β-ol acetate.

Example VI

The acetate of 17α-methyl-$\Delta^2$-androsten-17β-ol was treated in accordance with Example III, thus giving 17α-methyl - 1',1' - difluorocyclopropane - (2',3';2α,3α) - androstan-17β-ol acetate and 17α-methyl-1',1'-difluorocyclopropane-(2',3';2β,3β)-androstan-17β-ol acetate.

Example VII

A suspension of 1 g. of 1'-carbethoxycyclopropane-2',3';2α,3α)-androstan-17β-ol acetate in 60 cc. of methanol was treated with a solution of 1 g. of potassium carbonate in 6 cc. of water and the mixture was refluxed for 1 hour, then cooled and diluted with ice water. The precipitate formed was collected by filtration and recrystallized from acetone-hexane, thus affording 1'-carboxycyclopropane-(2',3';2α,3α)-androstan-17β-ol.

There were treated in the same manner 1',1'-dichlorocyclopropane-(2',3';2α,3α)-androstan-17β-ol acetate, 1', 1' - difluorocyclopropane - (2',3';2α,3α) - androstan-17β-ol acetate and 1',1'-difluorocyclopropane-(2',3';2β, 3β)-androstan-17β-ol acetate, thus giving respectively, 1',1' - dichlorocyclopropane - (2',3';2α,3α) - androstan-17 - ol, 1',1' - difluorocyclopropane - (2',2';2α,3α) - androstan-17β-ol and 1',1'-difluorocyclopropane-(2',3';2β, 3β)-androstan-17β-ol.

Example VIII

A mixture of 1 g. of 1'-carboxycyclopropane-(2',3'; 2α,3α)-androstan-17-ol, 4 cc. of pyridine and 2 cc. of propionic anhydride was kept overnight at room temperature and then poured into ice water; the precipitate formed was collected, washed with water, dried and crystallized from acetone-hexane, thus yielding the propionate of 1'-carboxycyclopropane-(2',3';2α,3α)-androstan-17β-ol.

By the same process there were treated 1',1'-dichlorocyclopropane - (2',3';2α,3α) - androstan - 17β - ol, 1',1'-difluorocyclopropane - (2',3';2α,3α) - androstan - 17β - ol and 1',1' - difluorocyclopropane - (2',3';2β,3β) - androstan-17β-ol, thus affording, respectively: the propionate of 1',1' - dichlorocyclopropane - (2',3';2α,3α) - androstan-17β-ol, the propionate of 1',1'-difluorocyclopropane-(2',3';2α,3α)-androstan-17β-ol and the propionate of 1',1'-difluorocyclopropane-(2',2';2β,3β)-androstan-17β-ol.

Example IX

The starting compounds of the preceding example were treated by the process described in that example, except that the propionic anhydride was substituted by caproic anhydride, cyclopentylpropionic anhydride and benzoyl chloride, thus obtaining the corresponding caproates, cyclopentylpropionates and benzoates.

Example X

A solution of 0.17 g. of potassium hydroxide in 2 cc. of water and 2.5 of methanol was added over a period of 30 minutes to a boiling solution of 1 g. of 17α-methyl-1' - carbethoxycyclopropane - (2',3';2α,3α) - androstan-17β-ol acetate in 30 cc. of methanol, under an atmosphere of nitrogen.

The mixture was boiled for 2 hours further, cooled, neutralized with acetic acid and concentrated under reduced pressure.

By the addition of water, followed by crystallization of the precipitate from acetone-hexane, there was produced 17α-methyl - 1' - carboxycyclopropane - (2',3'; 2α,3α)-androstan-17β-ol. By the same process there treated 17α - methyl - 1',1' - dichloropropane - (2',3,; 2α,3α)-androstan-17β-ol acetate and 17α-methyl-1',1-difluorocyclopropane - (2',3';2α,3α) - androstan - 17β - ol acetate, thus affording respectively 17α-methyl-1',1'-dichlorocyclopropane - (2',3';2α,3α) - androstan - 17β-ol and 17α-methyl - 1',1' - difluorocyclopropane-(2',3';2α,3α)-androstan-17β-ol.

Example XI

To a solution of 5 g. of 17α-methyl-1'-carboxycyclopropane-(2',3'; 2α,3α)-androstan-17β-ol in 100 cc. of anhydrous benzene was added 1 g. of p-toluenesulfonic acid and 10 cc. of propionic anhydride, and the mixture was kept standing at room temperature for 24 hours; after pouring into ice water, the resulting mixture was stirred in order to hydrolyze the excess of anhydride. The benzene layer was then separated, washed with 10% sodium carbonate solution and water, dried and evaporated; crystallization of the residue from ether-hexane furnished the propionate of 17α-methyl-1'-carboxycyclopropane-(2',3'; 2α,3α)-androstan-17β-ol.

*Example XII*

In the same manner there were treated 17α-methyl-1',1'-dichlorocylopropane-(2',3'; 2α,3α)-androstan-17β-ol and 17α-methyl-1',1'-difluorocyclopropane-(2',3'; 2α,3α)-androstan-17β-ol, thus giving respectively: the propionate of 17α-methyl-1',1'-dichlorocyclopropane-(2',3'; 2α,3α)-androstan-17β-ol and the propionate of 17α-methyl-1',1'-difluorocyclopropane-(2',3'; 2α,3α)androstan-17β-ol.

*Example XIII*

The starting compounds of the preceding example were treated by the process described in that example, except that the propionic anhydride was substituted by caproic anhydride, cyclopentylpropionic anhydride and undecenoic anhydride, thus furnishing the corresponding caproates, cyclopentylpropionates and undecenoates.

I claim:
1. A compound of the following formula:

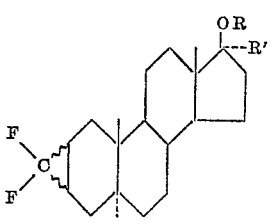

wherein R is selected from the group consisting of hydrogen and a hydrocarbon carboxylic acyl group of less than 12 carbon atoms and R¹ is selected from the group consisting of hydrogen and lower alkyl.

2. 1',1'-difluorocyclopropane-(2'3'; 2α,3α)-androstan-17β-ol.
3. 1',1'-difluorocyclopropane-(2',3'; 2β,3β)-androstan-17β-ol.
4. 1',1'-difluorocyclopropane-(2',3'; 2α,3α)-androstan-17β-ol-acetate.
5. 1',1'-difluorocyclopropane-(2',3'; 2β,3β)-androstan-17β-ol-acetate.
6. 17α-methyl - 1',1'-difluorocyclopropane-(2',3'; 2α,3α)-androstan-17β-ol.
7. 17α-methyl - 1',1'-difuorocyclopropane-(2',3'; 2α,3α)-androstan-17β-ol-acetate.
8. A compound of the following formula:

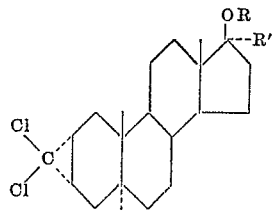

wherein R is selected from the group consisting of hydrogen and a hydrocarbon carboxylic acyl group of less than 12 carbon atoms and R¹ is selected from the group consisting of hydrogen and lower alkyl.

9. 1',1'-dichlorocyclopropane-(2',3'; 2α,3α)-androstan-17β-ol.
10. 1',1'-dichlorocyclopropane - (2',3'; 2α,3α)-androstan-17β-ol-acetate.
11. 17α-methyl-1',1'-dichlorocyclopropane -(2',3'; 2α,3α)-androstan-17β-ol.
12. 17α-methyl-1',1' - dichlorocyclopropane-(2',3'; 2α,3α)-androstan-17β-ol-acetate.
13. A compound of the following formula:

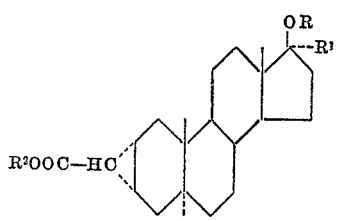

wherein R is selected from the group consisting of hydrogen and a hydrocarbon carboxylic acyl group of less than 12 carbon atoms and R¹ and R² are members of the group consisting of hydrogen and lower alkyl.

14. 1'-carbethoxycyclopropane-(2',3'; 2α,3α) - androstan-17β-ol-acetate.
15. 17α-methyl-1'-carbethoxycyclopropane - (2',3'; 2α,3α)-androstan-17β-ol-acetate.
16. 1'-carboxycyclopropane-(2',3'; 2α,3α) - androstan-17β-ol.
17. 17α-methyl-1'-carboxycyclopropane-(2'3'; 2α,3α)-androstan-17β-ol.
18. 17α-methyl-1'-carboxycyclopropane-(2',3'; 2α,3α)-androstan-17β-ol propionate.

No references cited.